UNITED STATES PATENT OFFICE.

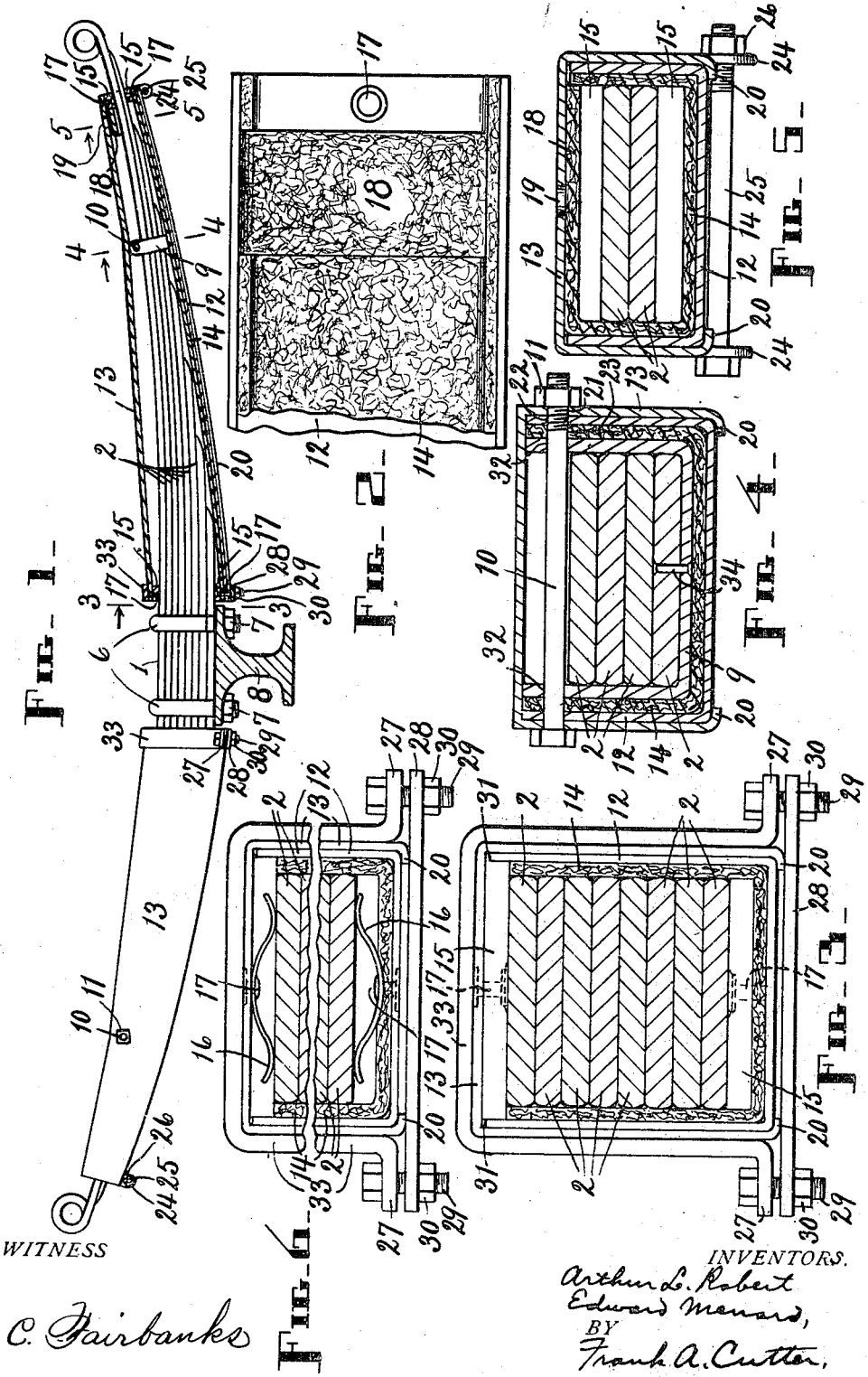

ARTHUR L. ROBERT AND EDWARD MENARD, OF SPRINGFIELD, MASSACHUSETTS.

COMBINED COVERING AND OILER FOR SPRINGS.

1,242,044. Specification of Letters Patent. Patented Oct. 2, 1917.

Application filed January 24, 1917. Serial No. 144,178.

*To all whom it may concern:*

Be it known that we, ARTHUR L. ROBERT and EDWARD MENARD, both citizens of the United States of America, and residents of Springfield, in the county of Hampden and State of Massachusetts, have invented a new and useful Combined Covering and Oiler for Springs, of which the following is a specification.

Our invention relates to combined coverings and oilers for vehicle springs and more especially automobile springs, or, in other words coverings or casings which are capable of protecting such springs and at the same time of supplying oil to the same, and said invention consists of an open-ended trough and an open-ended cover of peculiar construction, the former having a lining of absorbent material, and yielding end bearings in said trough and cover, together with certain auxiliary and subsidiary parts and members or elements necessary to complete the organization, all as hereinafter set forth.

It is a well known fact that the leaf or laminated springs of vehicles, such as automobiles, if unprotected, are frequently covered with moisture or become wet with water and consequently rust, are soon coated with dust and dirt, and in a comparatively short time force out the lubricant which is introduced between the leaves or laminæ when the springs are assembled, with the result that said springs must be wiped off and cleaned often and be taken apart periodically and supplied with more lubricant, if their life is to be prolonged and their serviceability maintained at the point of highest efficiency. And the primary object of our invention is to produce a device which excludes water and dust, grit and dirt from the spring and prevents rust from forming thereon, and which also serves as a means of lubricating said spring, whereby the latter is effectually oiled and thereby and by reason of the protection afforded against exterior deteriorating agencies its life and efficiency are greatly increased. The use of this device obviates the labor and expense that otherwise would be involved in caring for the spring, and keeps the spring in better condition than it could be kept in the old way.

A further object is to provide a device of this kind that is comparatively simple and inexpensive in construction, and can easily and quickly be applied to the spring. There are no pivotally-connected overlapping side plates and there is no lacing in our combined covering and oiler, both of which are objectionable for obvious reasons.

Another object is to afford simple but convenient and entirely satisfactory means for supplying and distributing the oil, so that the same shall reach the sides and bottom of the spring and freely lubricate its laminæ, working in between the latter as they expand and contract under the varying pressure to which the spring is subjected when in action.

Still another object is to utilize the rebound-clip bolts of the spring for the purpose of assisting in securing our devices to said spring.

Other objects and advantages will occur in the course of the following description.

We attain the objects and secure the advantages of our invention by the means illustrated in the accompanying drawings, in which—

Figure 1 is a side elevation of a spring having applied thereto a pair of combined coverings and oilers which embody a practical form of our invention, one of the new devices being in elevation and the other in longitudinal section; Fig. 2, an enlarged detail, in top plan, of a portion of the trough and absorbent lining at one end; Fig. 3, an enlarged transverse section through said spring and end elevation of one of the devices thereon, taken on lines 3—3, looking in the direction of the associated arrow, in Fig. 1; Fig. 4, an enlarged transverse section through said spring and device, taken on lines 4—4, looking in the direction of the associated arrow, Fig. 1; Fig. 5, a similar section, on lines 5—5, looking in the direction of the associated arrow, Fig. 1, and, Fig. 6, a section and elevation similar to Fig. 3, but with the middle portion broken out, and showing a modified form of yielding bearings at the larger end of the device.

Similar reference characters designate similar parts throughout the several views.

In the drawings and for the purpose of illustrating the application of our invention, we show one form of a semi-elliptic leaf spring, the same being designated by the reference numeral 1 and being composed of a plurality of leaves 2 all held together by clips 6—6 and nuts 7—7, and secured by said clips and nuts to a supporting axle 8. The spring 1 is equipped a short distance in from each end with a rebound clip 9 to hold the leaves of said spring together and prevent them from separating or becoming displaced laterally, a bolt 10 and a nut 11, as usual.

A spring such as is herein shown necessarily requires two of our combined covering and oiling devices, one each side of the central support for said spring, but they are both essentially alike and interchangeable.

The new device comprises a casing which consists of a trough 12 and a cover 13, both open at the ends and having the general shape or contour of the spring 1, or of that portion of said spring which is between either end and the adjacent clip 6, which portion said trough and cover fit onto and completely inclose at the top, bottom and sides. Said device further comprises a lining 14, of absorbent material as felt, which is in the trough 12, and yielding bearings, such as 15 (or 16), interposed between the bottom of the trough 12 at the ends and the spring 1 and between the top of the cover 13 at the ends and said spring. In addition to the members just mentioned there are fastening means which will presently be described.

The felt lining 14 lies on the floor of the trough 12 and against the sides of said trough, said lining thus itself forming a trough in which the spring 1 is received. The bearings 15 (or 16) are arranged transversely in both the trough 12 and the cover 13, to which said bearings are riveted at 17, and the end portions of the lining 14 are disposed beneath said bearings in said trough and between the ends of said last-named bearings and the sides of said trough, so that said lining is held in place in said trough by said last-named bearings and their rivets. The lining 14 has a flap 18 which extends over the spring 1 from the upper edge on one side of said lining to the upper edge on the opposite side thereof, such flap being preferably located at the more shallow end of the lining, because such end is at a greater elevation than the other. Thus the flap 18 is at the highest point of the lining 14. The flap 18 is directly under an opening 19 in the top of the cover 13, and oil is poured through such opening, from time to time as may be required, and saturates the lining 14, being first received on said flap and then spreading therefrom to and throughout the entire lining, the higher elevation of the flap promoting such distribution of the oil.

The cover 13 is provided with bottom flanges 20—20 to fit under the trough 12 and engage the bottom thereof, thus assisting in holding said cover in place on said trough. The cover 13 is of thin sheet-metal, as is also the trough 12, and the sides of said cover can, therefore, be and in practice are sprung outwardly far enough to permit the flanges 20 to clear or pass down the sides of said trough, when said cover is placed over said trough, said cover sides then contracting and coming into full contact with said trough sides, with said flanges engaging the trough bottom. Besides the oil-receiving opening 19 in the top of the cover 13, there are openings 21—21 in the sides of said cover, and in registry with said openings 21 are openings 22—22 in the sides of the trough 12, and openings 23—23 in the sides of the lining 14. The openings 21, 22 and 23 are for the passage of one of the bolts 10. At the outer and more shallow end of the cover 13 are two perforated lugs 24 which depend from the sides of said cover, a bolt 25 with a nut 26 being provided for said lugs.

The bearings 15 are preferably made of rubber, and they serve both to provide tight yet yielding connections between the trough 12 and cover 13 and the spring 1, so that the normal action of the spring is not interfered with and the casing is not unduly strained by such action, and to close the ends of the casing to the entrance of water and dust. These cushion bearings are preferably used at both ends of the casing, but, in the event sufficient flexibility be not afforded thereby at the inner and larger end of said casing, springs, such as those shown at 16 in the last view, may at such end be substituted for the rubber members. Usually, however, the rubber or cushion bearings will be found to be entirely adequate for either end of the device.

As suitable and convenient means for securing the cover 13 to the trough 12 and both to the spring 1, at the larger end of the casing, we employ a clip 33 which fits over said cover and has outwardly-extending perforated lugs 27—27, a perforated bar 28 which extends under said trough and bears against the flanges 20, bolts 29—29 which pass through the perforations in said lugs and bar, and nuts 30—30 on said bolts. The arms of the clip 33 are short enough to enable the nuts 30, when tightened on the bolts 29, to draw said clip downward and force the bar 28 upward until the bearings 15 (or 16) at that end are caused, through the medium of the cover 13 and the trough 12, to grasp firmly the spring 1 from above and below. To this end clearance is left between the upper edges of the sides of the trough 12 and the top of the cover 13, as indicated at 31—31 in Fig. 3.

In practice, the trough 12 is brought up under the spring 1, on the side of the central support (represented by the clips 6 and axle 8), with which said trough as held agrees, the nut 11 and bolt 10 on that side having been removed, the flap 18 is laid across said spring, and the cover 13 is sprung into place over said trough. Next the several fastening members are applied. The aforesaid bolt 10 and nut 11 are replaced, the former passing through the openings 21, 22 and 23 prepared for it in the sides of the cover 13, trough 12 and lining 14, as well as through the openings 32—32, Fig. 4, in the aforesaid clip 9, with the head of said bolt against the outside of one side of said cover and said nut against the outside of the opposite side of said cover. A very secure fastening for all of the parts is afforded by the said bolt 10 with its nut 11. The clamping means which include the clip 33 and its associated parts and members are applied in the manner previously quite fully explained. And the bolt 25 is passed through the lugs 24, under the trough 12, and is secured with the nut 26. Thus is the cover securely fastened at the ends to the trough and both said trough and cover firmly attached at the ends to the spring 1.

After the device has been attached to the spring 1, oil is applied through the opening 19 to the flap 18 and the lining 14, and the oil so applied is in turn taken up by said spring, since said lining contacts with the bottom and sides of said spring. The oil from the saturated felt not only covers the bottom and sides of the spring 1, but finds its way in between the leaves 2, so that said spring is lubricated in the most thorough manner both without and within.

The casing with its cushion bearings 15 in contact with the spring 1 protects the same in the most thorough manner, as hereinbefore made plain.

In Fig. 4 the clip 9 is represented as being riveted at 34 to the leaf 2, of the spring 1, with which the horizontal member of said clip is in direct contact.

We are aware that various types of coverings have been produced heretofore for the purpose of protecting springs, and that various means have been employed for lubricating springs, and do not, therefore, seek to claim either such a covering or such a means broadly.

What we do claim as our invention, and desire to secure by Letters Patent, is—

1. The combination, in a device of the class described, of an open-ended trough, a lining of absorbent material in the bottom and against the sides of said trough, said lining having a transverse top flap of less width than the length of the lining, an open-ended cover for said trough, said cover having an opening therein over said flap, and means to fasten said trough and cover together and to a vehicle spring.

2. The combination, in a device of the class described, with a vehicle spring, of an open-ended trough, a lining of absorbent material in said trough, an open-ended cover for said trough, yielding bearings in the ends of said trough and cover to contact with said spring, and means to fasten said trough and cover together and to said spring.

3. The combination, in a device of the class described, of an open-ended trough, a lining of absorbent material in said trough, means to fasten the ends of said lining to said trough, an open-ended cover for said trough, and means to fasten said trough and cover together and to a vehicle spring.

4. The combination, in a device of the class described, with a vehicle spring, of an open-ended trough, a lining of absorbent material in the bottom and against the sides of said trough, said lining having a transverse top flap of less width than the length of the lining, an open-ended cover for said trough, said cover having an opening therein over said flap, yielding bearings in the ends of said trough and cover, to contact with said spring, said bearings in said trough serving as securing means for the ends of said lining, and means to fasten said trough and cover together and to said spring.

5. In a device of the class described, a casing comprising an open-ended trough, and an open-ended cover for said trough, said cover having flanges to extend beneath and engage said trough.

6. The combination, in a device of the class described, with a vehicle spring, and a rebound clip, bolt and nut, of an open-ended trough, a lining of absorbent material in said trough, and an open-ended cover for said trough, the sides of said trough, lining and cover being perforated for the passage of said bolt.

7. The combination, in a device of the class described, with a vehicle spring, of an open-ended trough, a lining of absorbent material in said trough, an open-ended cover for said trough, said cover having depending lugs at one end, yielding bearings in the ends of said trough and cover to bear on said spring, a bolt passing through said lugs and beneath said trough, a nut on said bolt, and means to fasten the opposite ends of said trough and cover together and to said spring.

8. The combination, in a device of the class described, with a vehicle spring, of an open-ended trough, a lining of absorbent material in said trough, an open-ended cover having depending lugs at one end, yielding bearings in the ends of said trough and cover to bear on said spring, a bolt passing through said lugs and beneath said trough, a nut on said bolt, and a clip and bar with bolt and nut connections at the opposite ends of said trough and cover, to fasten the same together and to said spring.

9. The combination, in a device of the class described, with a vehicle spring, and a rebound clip, bolt and nut, of an open-ended trough, a lining of absorbent material in said trough, an open-ended cover for said trough, the sides of said trough, lining and cover being perforated for the passage of said bolt, and fastening means at the ends of said trough and cover.

10. The combination, in a device of the class described with a vehicle spring, of an open-ended trough, a lining of absorbent material in said trough, an open-ended cover for said trough, said trough and cover being provided with yielding end bearings to contact with said spring and close the spaces between said ends and said spring, and means to fasten said trough and cover together and to said spring.

11. The combination, in a device of the class described, with a vehicle spring, and a rebound clip, bolt and nut, of an open-ended trough, a lining of absorbent material in the bottom and against the sides of said trough, said lining having a transverse top flap, an open-ended cover for said trough, said cover having an opening therein over said flap, and being provided at one end with depending lugs, and at the sides with flanges to extend beneath and engage said trough, yielding bearings in the ends of said trough and cover to bear against said spring, said bearings in said trough serving as securing means for the ends of said lining, a bolt passing through said lugs and beneath said trough, a nut for said bolt, and means to fasten the opposite ends of said trough and cover together and to said spring, the sides of said trough, lining and cover being perforated for the passage of said rebound-clip bolt.

ARTHUR L. ROBERT.
EDWARD MENARD.

Witnesses:
F. A. CUTTER,
A. C. FAIRBANKS.